May 21, 1963  J. B. GODSHALK  3,090,399
AUTOMATIC POULTRY WATERING VALVE
Filed Aug. 3, 1961
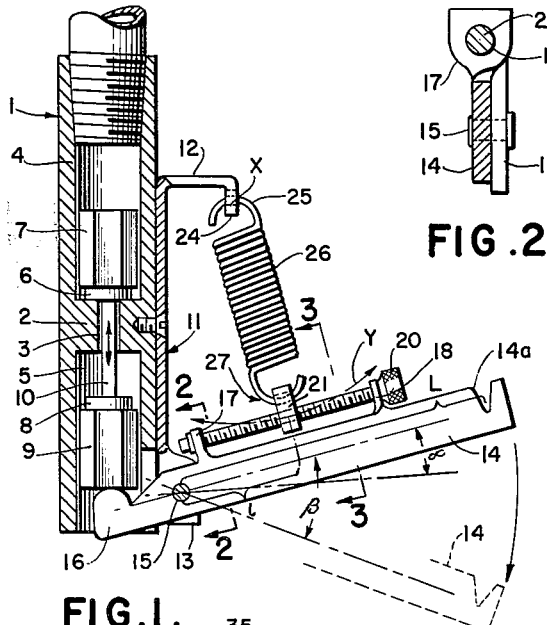
FIG.1.
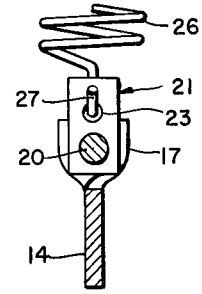
FIG.2.
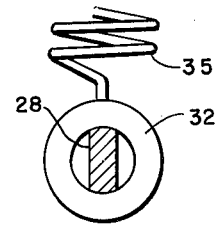
FIG.3.
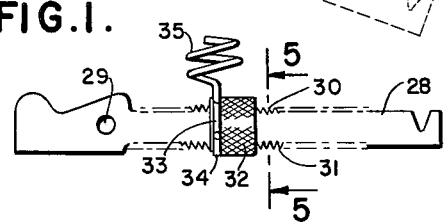
FIG.4.
FIG.5.
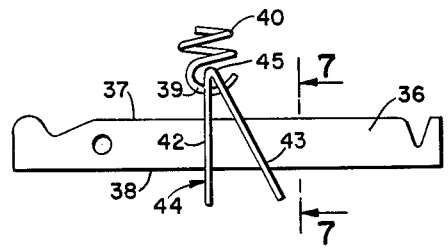
FIG.6.
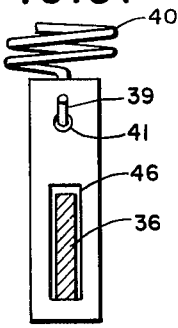
FIG.7.
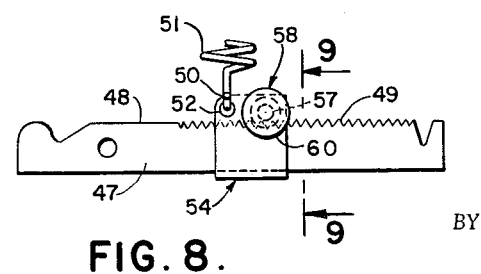
FIG.8.
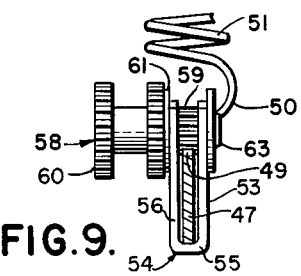
FIG.9.
INVENTOR
James B. Godshalk
BY Arnold and Roylance
ATTORNEYS

United States Patent Office 3,090,399
Patented May 21, 1963

3,090,399
AUTOMATIC POULTRY WATERING VALVE
James B. Godshalk, Pikeland Township, Chester County, Pa., assignor to Fox Products Company, Philadelphia, Pa., a corporation of Pennsylvania
Filed Aug. 3, 1961, Ser. No. 129,028
4 Claims. (Cl. 137—614.14)

This invention relates to improvements in automatic valves and more particularly to valves adapted to maintain a substantially constant level of liquid in a container, such as a poultry watering trough or the like, the invention being especially directed to valves wherein actuation is accomplished automatically and directly in response to changes in the weight of liquid in the container. Valves of this general type are seen, for example, in Reissue Patent 23,447, issued December 25, 1951, to Pruitt. The present application is a continuation in part of my copending application Serial Number 747,663, filed July 10, 1958, now abandoned.

Automatic valves of this type are normally associated with a container in such fashion that the combined weight of the container and the water therein acts in opposition to a biasing spring to determine the position of the movable element or elements of the valve. Until recent times, such valves have been so designed that the weight of the container when empty was insufficient to open the valve. Accordingly, it was necessary to employ some means, usually a manually set latch, to hold the valve in open position until sufficient water collected in the container to allow automatic operation of the valve in response to the combined weight of container and water. Such prior art arrangements have the advantage that the valve is automatically closed, cutting off the flow of water, in the event that the container should be accidentally displaced or knocked over. On the other hand, such arrangements have the disadvantage that a manual action is required to place the device in operation.

Poultry growers, who make up one of the largest groups presently employing valves of the type referred to, have now adopted watering trough constructions of such nature that the danger of the trough being upset or otherwise accidentally displaced is substantially eliminated, so that the need for a manual starting latch has been largely eliminated. In view of such changes in the requirements of the users of these valves, it is accordingly desirable to employ such valves without the starting latch so that the valve will be self-starting. Insofar as I am aware, however, no commercially satisfactory latchless valve of this type has heretofore been proposed.

Conventional valves of the type referred to are not capable of proper operation without a starting latch because, if the biasing spring is so made that the valve opens upon application of the weight of the empty container, the valve then closes with too small a quantity of water in the container. On the other hand, if the spring is adjusted so that the valve will not close until the water or other liquid reaches an adequate depth, then the force applied by the biasing spring is so great that the weight of the empty container is inadequate to cause the valve to open. Among poultry growers, the problem is complicated by the fact that, to be thoroughly satisfactory on a commercial basis, such valves must be capable of use with any of various watering troughs differing in weight and water capacity, so that the specific operational requirements of the valve are not known precisely at the time the valve is manufactured.

It has heretofore been proposed to make the point of attachment of the lower end of the biasing spring to the actuating arm of the valve adjustable, lengthwise of the actuating arm, by providing a series of separate openings in the actuating arm, through which openings the lower end of the spring can be selectively hooked. Similarly, it has been proposed to employ a series of adjacent notches in the actuating arm to receive the hooked lower end of the biasing spring. Since such arrangements allow attachment of the spring to the actuating arm in any of various positions, and so provide for varying the length of the moment arm through which the biasing spring acts, it would appear that valves constructed in this fashion could be made satisfactorily self-starting, so that the starting latch could be omitted. I have found, however, that any such arrangement is entirely ineffective to provide self-starting action in a valve of the type referred to because it allows only a step-by-step adjustment of the point of attachment of the spring to the actuating arm. In particular, I have discovered that, employing a watering trough or other receptacle selected at random from the various styles and weights available to the trade, it is impossible to provide the actuating arm of the valve with anything in the nature of a series of holes or notches, allowing stepwise adjustment of the point of attachment of the biasing spring, which will make it possible to adjust the spring to a position which will both allow self-starting and cause the valve to remain open until an adequate amount of liquid has been delivered to the receptacle. The wire from which the biasing springs are fashioned is, of course, of material diameter, so that such holes or notches necessarily must be comparatively large. The situation is such that, regardless of how the holes or notches are designed and arranged, the effect of the biasing spring usually is too great when the same is engaged in one hole or notch and markedly too small when engaged in the next, when the valve is applied to a trough selected at random from the various sizes and weights of troughs available to the trade.

It is accordingly a general object of the invention to devise an automatic valve of the type referred to which requires no starting latch, yet is capable of satisfactory automatic operation with watering troughs or other containers of various designs and weights.

Another object of the invention is to provide an automatic valve of the type comprising a pivoted valve actuating arm biased toward a valve-closing position by a spring and on which a watering trough or other receptacle can be suspended to apply a force in opposition to the spring, such valve embodying novel and highly effective means for manually accomplishing a very fine, continuous adjustment of the point of connection of the spring to the valve actuating arm, with such adjustment being lengthwise of the arm.

In order that the manner in which these and other objects are attained in accordance with the invention can be understood in detail, reference is had to the accompanying drawings, which form a part of this specification, and wherein:

FIG. 1 is a view, partly in vertical section and partly in elevation, of an automatic poultry watering valve constructed in accordance with one embodiment of the invention, the valve being shown in its initial closed position with the biasing spring thereof in normal position, that is, the position occupied thereby prior to any adjustments required to adapt the valve for proper automatic operation with a particular trough;

FIG. 2 is a sectional view taken on line 2—2, FIG. 1;

FIG. 3 is a sectional view taken on line 3—3, FIG. 1;

FIG. 4 is a detail elevational view of a modified form of certain of the elements of the device of FIG. 1;

FIG. 5 is a sectional view taken on line 5—5, FIG. 4;

FIG. 6 is a view similar to FIG. 4, illustrating the actuating arm and novel means for connecting the biasing spring thereto in accordance with another embodiment of the invention;

FIG. 7 is a sectional view taken on line 7—7, FIG. 6, with some parts shown in elevation;

FIG. 8 is a view similar to FIG. 4, illustrating the actuating arm and novel means for connecting the biasing spring thereto in accordance with still another embodiment of the invention; and FIG. 9 is a sectional view taken on line 9—9, FIG. 8, with some parts shown in elevation.

Referring now to the drawings in detail, and first to FIGS. 1-3 thereof, it will be seen that the embodiment of the invention here illustrated comprises a generally tubular housing 1 having an interior partition 2 provided with a central bore 3. There is thus provided, on one side of the partition 2, an upper valve chamber 4, and, on the other side of partition 2, a lower valve chamber 5. Disposed in upper valve chamber 4 adjacent partition 2 is a resilient valve gasket 6 and there is provided, immediately above the gasket 6, a polygonal weight 7. Similarly, valve chamber 5 contains a resilient gasket 8 and, below the gasket, a polygonal weight 9. Extending through bore 3 is a pin 10 of smaller cross section than the bore 3 and of a length such as to project beyond the limits of the bore into engagement with the gaskets 6 and 8.

Rigidly secured to the outside of housing 1 is a bracket 11 having at its top a laterally directed projection 12 and at its bottom a laterally projecting ear 13. A valve actuating arm 14 is pivoted at 15 to ear 13 and has one end 16 extending within valve chamber 5 below weight 9. The other end portion of arm 14 is elongated and projects laterally away from valve body 1. The arm 14 is formed as by stamping, from flat, stiff sheet material, and is provided at its end with a notch 14ª from which the watering trough is suspended in the usual manner.

Along its upper edge, arm 14 is provided with a pair of integral, spaced ears 17 and 18. The ears 17, 18 are formed initially in such fashion as to lie in the plane of the flat, main body of arm 14 and are then bent to lie in a plane at right angles thereto, as will be clear from FIGS. 1 and 2. Ears 17 and 18 are each provided with a circular opening, as seen at 19, FIG. 2. A thumb screw 20 extends first through ear 18, then through a nut member 21 and finally through ear 17, the thumb screw being thus rotatable in the ears 17, 18. To prevent axial displacement of the thumb screw, the tip thereof may be flattened, at 22, to provide a shoulder capable of engaging ear 17.

As seen in FIG. 3, nut member 21 is provided with a small opening 23 spaced above the threaded opening which accommodates thumb screw 20.

Laterally projecting portion 12 of bracket 11 is provided with an outwardly disposed, downwardly extending tip portion 24 having a suitable opening through which extends the upper end portion 25 of a coil spring 26. As will be clear from FIGS. 1 and 3, the lower end portion of spring 26 is engaged in opening 23 of nut member 21. Thus, while the point of attachment of the upper end of spring 26 is fixed, as is usually the case in valves of this type, the lower end portion 27 of the biasing spring is not connected directly to the actuating arm, but rather to a member (nut member 21 in this embodiment) which is capable of continuous adjustment lengthwise of the actuating arm. Within the length of the threaded portion of screw 20, nut member 21 can be adjusted to any of an infinite number of positions along the actuating arm.

FIG. 1 illustrates the valve in its initial closed position, existing before the weight of the empty trough is applied to the actuating arm. Thus, the actuating arm is in its uppermost positon, and the valve is closed because gasket 6 is held seated on partition 2 by weight 7 and the hydraulic pressure of the water supply. Further, spring 26 is in its normal initial position, with nut member 21 approximately in the center of its range of adjustability lengthwise of the actuating arm. Thus, the line of travel of the nut member 21 lengthwise of the actuating arm is tangent to a circle Y described about the point of engagement X of spring end portion 25 and tip 24 of bracket 11. The longitudinal axis of spring 26 is at right angles to the line of travel of nut member 21 along the actuating arm.

Still referring to FIG. 1, it will be understood that, in order to start the positive flow of water through the valve, the actuating arm must be pivoted downwardly through a given angle $\alpha$, such pivotal movement being caused by the weight of the empty trough applied to the actuating arm by hanging the bail of the trough in notch 14ª. Similarly, the valve is again closed when the actuating arm has traversed a given angle $\beta$, causing weight 9 to force gasket 8 to seat against partition 2.

For any particular position of nut member 21, the downward force W, necessary to move the actuating arm through angle $\alpha$ can be calculated in accordance with the formula $$W_1 = \frac{Kl}{L} \sin \alpha$$

where K is the spring constant of spring 26, $l$ is the distance from pivot 15 to the position of nut member 21, and L is the distance from pivot 15 to the point (notch 14ª) at which the trough is suspended from the actuating arm. Similarly, the force $W_2$ required to move the adjusting arm downwardly through angle $\beta$ can be calculated in accordance with the formula $$W_2 = \frac{Kl}{L} \sin \beta$$

If the valve is to function to maintain an adequate amount of water in the trough, I have discovered that the ratio of $W_2$ to $W_1$ must be at least 2:1 and, therefore, the ratio of sin $\beta$ to sin $\alpha$ must be at least 2:1.

As will be apparent from the explanation following immediately below, this requirement dictates that, for all positions of nut member 21 within its range of adjustability lengthwise of the actuating arm, spring 26 must be as near the completely relaxed position as possible when the actuating arm is in its initial, valve-closing position, illustrated in FIG. 1.

If, for the position of actuating arm 14 seen in FIG. 1, the spring 26 is under any material amount of initial tension, then the spring exhibits a force F, applied in a direction biasing arm 14 upwardly. Then, $$W_1 = \frac{Kl \sin \alpha + F_1}{L}$$

and $$W_2 = \frac{Kl \sin \beta + F_1}{L}$$

so that the ratio of $W_2$ to $W_1$, instead of being equal simply to the ratio of sin $\beta$ to sin $\alpha$, is now $$\frac{\sin \beta + F_1}{\sin \alpha + F_1}$$

The latter ratio will always be smaller than the former, and the required ratio of 2:1 accordingly quickly becomes impossible to attain as the initial spring force $F_1$ increases.

Hence, spring 26 is so designed that there is essentially no initial spring force for the condition illustrated in FIG. 1. In other words, with arm 14 in its initial valve-closing position, and with nut member 21 at approximately the midpoint in its range of adjustability, spring 26 is essentially relaxed. Though adjustment of nut member 21 either toward or away from valve body 1 will involve a slight initial tensioning of spring 26, increasing as the extent of adjustment of the nut member increases, I have found that this is so small that it can be ignored, so long as (1) the point of connection of the lower end of the spring is made continuously adjustable along a line tangent to circle Y, FIG. 1, with the range of such adjustability approximately centered on the point of tangency, and (2) the spring is so chosen, relative to the design parameters of the valve, as to be at least essentially relaxed when the actuating arm and spring are in the positions shown in FIG. 1.

FIGS. 4 and 5 illustrate a further embodiment of the invention which, like that of FIGS. 1–3, employs screw thread means to accomplish continuous adjustment of the point of attachment of the biasing spring to the actuating arm. Actuating arm 28 is again made in the form of a flat piece of rigid sheet metal having an opening 29 to provide for the pivotal attachement of the arm to the valve assembly, in the same fashion described with reference to elements 13, 15, FIG. 1. Over a considerable portion of its length, arm 28 is effectively threaded by being provided with two series of suitably disposed edge notches 30 and 31, the two series of notches being offset slight, with respect to each other and longitudinally of the actuating arm, to provide the proper disposition for engagement with the interior threads of a nut member 32. At one end, nut member 32 is provided with a smooth, circular, transversely disposed groove 33 in which is engaged the lower, hooked end portion 34 of coil spring 35. Spring 35, of course, corresponds to spring 26, FIG. 1, and it will be understood that the actuating arm 28 of the embodiment illustrated in FIGS. 4 and 5 is arranged in the valve assembly in precisely the same manner as has been described with reference to arm 14, FIG. 1. It will thus be understood that nut member 32 provides a means for adjusting the point of connection of the lower end of the biasing spring 35 to the actuating arm 28 in continuous fashion in a direction lengthwise of the actuating arm. Thus, nut member 32 can be adjusted to any of an infiinite number of positions within that portion of the length of the actuating arm which is provided with the edge notches 30 and 31.

While the embodiments of FIG. 1 and FIG. 4 accomplish such continuous adjustment by screw thread means, the same result is accomplished in the embodiment of FIGS. 6 and 7 by means of a simple slide member so constructed as to be normally held in fixed position on the actuating arm. In this embodiment of the invention, actuating arm 36 is similar to arm 28, FIG. 4, except that its parallel edge portions 37, 38 are straight and smooth. The lower hooked end portion 39 of biasing spring 40 extends through aligned openings, indicated at 41, FIG. 7, in the two arms 42, 43 of a slide member 44. The member 44 is fashioned from a flat piece of resilient sheet metal bent to provide a sharp apex portion 45 joining the two arms 42, 43. Thus, member 44 is generally in the shape of a V.

The two arms 42, 43 of member 44 are each provided with a rectangular window in the manner seen at 46, FIG. 7 through which windows the actuating arm 36 extends. Since, as will be clear from FIG. 6, arm 42 is generally vertical, while arm 43 slants downwardly and outwardly, the rectangular window of arm 43 is made somewhat longer than that of arm 42.

The bend at apex portion 45 of slide 44 is made of such shape that the resilient nature of the slide biases arms 42 and 43 away from each other, with the lower edges of the rectangular windows brought into good frictional engagement with edge 37 of arm 36. In this connection, it is desirable to have the window of arm 42 of such dimension that only a limited tilting of the arm 42 with respect to actuating arm 36 is allowed. When it is desired to adjust slide member 44 along actuating arm 36, the free ends of the slide member are clasped between the thumb and forefinger and pressed together to free the slide member with respect to the actuating arm, the slide then being moved until arm 42 thereof occupies the desired position, the free ends of arms 42 and 43 then being released so that the slide member returns resiliently to its normal condition, with the bottom edge portions of the windows again frictionally engaging lower edge 37 of the actuating arm.

In the further embodiment of the invention illustrated in FIGS. 8 and 9, continuous, very fine adjustment of the effective point of connection of the biasing spring to the actuating arm is accomplished by means of a rack and pinion arrangement. Here, actuating arm 47 is constructed in precisely the same fashion as arm 36, FIG. 6, except that the straight upper edge portion 48 is provided with a series of rack teeth indicated at 49. The lower hooked end portion 50 of biasing spring 51 extends through an opening 52 in one arm 53 of a U-shaped, sheet metal pinion carrier indicated generally at 54. Pinion carrier 54 includes a short base portion 55 and a second arm 56, arms 53 and 56 being parallel and disposed each on a different side of the actuating arm 47. Near their free ends, and spaced from opening 52, arms 53 and 56 are provided with coaxially aligned bearing openings located as shown by the broken line 57, FIG. 8.

A rotatable pinion member, indicated generally at 58, is employed, this member including a pinion 59 extending through openings 57 and meshed with rack teeth 49. Formed integrally with pinion 59 is a manual operating knob 60. Between knob 60 and arm 56, there is disposed a normally cup-shaped spring washer 61. Adjacent the outer face of arm 53, the pinion member carries a plain washer 62. The free tip of the pinion member is belled or otherwise deformed, as indicated at 63, FIG. 9, in such fashion that spring washer 61 is held under compression between arm 56 of the pinion carrier and the adjacent end face of knob 60.

Base portion 55 of pinion carrier 54 extends immediately below the lower edge of the actuating arm 47, being in free sliding contact with the actuating arm and so holding pinion 59 in mesh with rack teeth 49. From FIG. 8, it will be seen that the pinion carrier extends for a substantial distance lengthwise of actuating arm 47, so that the pinion carrier is free from any material tendency to bind on the actuating arm.

When it is desired to make a fine adjustment of the effective point of attachment of the biasing spring 51 to the actuating arm 47, knob 60 is simply rotated manually, in either direction, so that pinion 59 is caused to roll along the series of rack teeth 49. Since spring washer 61, held under compression, applies a substantial frictional force between the pinion carrier and the pinion member, any tendency for the biasing spring to cause the pinion to roll along the actuating arm is eliminated. Hence, once a manual adjustment has been made, the pinion carrier, and therefore the lower end of the biasing spring, are held precisely in their adjusted position.

In all four embodiments of the invention illustrated, the effect of the adjustment of the point of attachment of the lower end of the biasing spring to the actuating arm is to change the length of the moment arm through which the biasing spring acts. This, in effect, changes the ability of the biasing spring to oppose the weight of the trough or other receptacle and any liquid contained therein. All four embodiments provide the fundamental advantage of allowing the operator to make an adjustment of the point of attachment of the lower end of the spring which is very fine and continuous, rather than stepwise, and the valve is thus made operative with any particular type of watering trough or other receptacle which the purchaser of the valve may choose to employ.

In all of the embodiments of the invention illustrated herein, the actuating arm can be provided with suitable calibrating indicia (not shown) with which the movable elements 21, 32, 44 and 54 cooperate to provide a precise indication of the adjusted position attained.

It will be understood that, for purposes of simplicity of illustration and description, the embodiments of the invention shown in FIGS. 4–9 are illustrated without the associated valve body, movable valve means and bracket for supporting the actuating arm and the upper end of the biasing spring. In this regard, the actuating arm in each of FIGS. 4, 6 and 8 is to be substituted for actuating arm 14, FIG. 1. Further, the movable connector means for the lower end of the biasing spring illustrated in FIGS. 4, 6 and 8 all serve the same purpose as the thumb screw and nut member shown in FIG. 1. Accordingly, it will be understood that, using any of the embodiments of FIGS. 4–9, the position of relationships hereinbefore described with reference to FIG. 1 are retained.

While, for purposes of simplicity of illustration, the invention has been described as applied to a truly "double actuating valve" of the general type disclosed in aforementioned Reissue Patent 23,447, it is to be understood that the invention is equally applicable to all other types of automatic valves in which the actuating arm is movable from a first position, in which the valve is maintained closed, through an intermediate position, in which the valve is open, to a final position in which the actuating arm again maintains the valve closed. In this regard, U.S. Patent 2,827,258 to Muhler illustrates a valve construction in which such valve action is accomplished with only a single movable valve member instead of the two movable valve members employed in more conventional double-actuating valves.

What is claimed is:

1. In a poultry watering valve of the type described, the combination of a valve body; movable valve means operatively arranged in said body; an operating lever supported on said body for pivotal movement from an initial position, in which said movable valve means is closed, through an intermediate position, in which said movable valve means is opened by said lever, to another position, in which said lever maintains said movable valve means closed; a movable connector operatively disposed on said lever for continuous infinitesimally fine adjustment lengthwise of said lever over a definite portion of the length of said lever, the pivotal axis of said lever being located between said body and said portion of said lever along which said connector is adjustable; a fixed support mounted on said body and spaced from said lever in the direction of movement of said lever from said other positions to said initial position and at least generally in the plane of movement of said lever; and a biasing spring of the tension type, one end of said spring being attached to said fixed means with substantial freedom for pivotal movement generally about its point of attachment to said support means, the other end of said spring being connected to said movable connector, adjustment of said movable connector over said portion of said lever causing the same to move in a straight line tangent to a circle, described about the point of connection of said one end of said spring to said support when said lever is in said initial position, said portion of said lever along which said connector is adjustable extending for a material distance on both sides of the said point of tangency to said line of movement of said movable connector, said spring being at least substantially relaxed when said movable connector is at said point of tangency and said lever is in said initial position, with the valve closed.

2. A poultry watering valve in accordance with claim 1 and wherein said connector means comprises screw thread means carried by said lever and a nut member operatively engaged with said screw thread means and to which said spring is connected.

3. A poultry watering valve in accordance with claim 1 and wherein said connector means comprises a spring slide including a pair of resiliently divergent arms having openings through which said lever extends, said biasing spring being connected to said slide.

4. A poultry watering valve in accordance with claim 1 and wherein said connector means comprisies rack teeth carried by said lever and a pinion member operatively engaging said rack teeth, said biasing spring being connected to said pinion member.

References Cited in the file of this patent
UNITED STATES PATENTS

| | | |
|---|---|---|
| 1,379,836 | Rackham | May 31, 1921 |
| 1,927,153 | Conrader | Sept. 19, 1933 |
| 2,119,567 | Williams | June 7, 1938 |
| 2,184,341 | Ferris | Dec. 26, 1939 |
| 2,634,755 | Hobbs | Apr. 14, 1953 |
| 2,800,917 | Hoffmeister | July 30, 1957 |

FOREIGN PATENTS

| | | |
|---|---|---|
| 623,251 | Great Britain | May 13, 1949 |